United States Patent [19]

Bitterli et al.

[11] Patent Number: 4,734,515

[45] Date of Patent: Mar. 29, 1988

[54] 1:2 METAL COMPLEXES OF 2-NITROSO-ACETOACETIC ACID AND BENZOYLACETIC ACID ARYLAMIDES

[75] Inventors: Peter Bitterli, Reinach; Jürgen Goldmann, Müchenstein; Bansi L. Kaul, Biel-Benken, all of Switzerland

[73] Assignee: Sandoz Ltd., Basel, Switzerland

[21] Appl. No.: 894,401

[22] Filed: Aug. 8, 1986

[30] Foreign Application Priority Data

Aug. 8, 1985 [DE] Fed. Rep. of Germany ....... 3528517

[51] Int. Cl.$^4$ ............................ C07F 1/08; C07F 3/06; C07F 15/04; C07F 15/06
[52] U.S. Cl. ........................................ 556/32; 556/33; 548/108; 548/109
[58] Field of Search ..................... 556/32, 33; 548/108, 548/109

[56] References Cited

U.S. PATENT DOCUMENTS

| 2,196,447 | 4/1940 | van Peski ............................... 556/33 |
| 3,296,130 | 1/1967 | Gee et al. ......................... 556/32 X |
| 3,338,938 | 8/1967 | Matlack ................................ 556/33 |
| 4,011,213 | 3/1977 | Wommack, Jr. ................. 556/33 X |

FOREIGN PATENT DOCUMENTS

| 1252341 | 10/1967 | Fed. Rep. of Germany ........ 556/32 |
| 1569666 | 1/1971 | Fed. Rep. of Germany ........ 556/32 |
| 1190052 | 3/1967 | United Kingdom . |

OTHER PUBLICATIONS

Chemical Abstracts 83 207609q (1975).
Chemical Abstracts 71 54292f (1969).
Chemical Abstracts 80 108134n (1974).
Chemical Abstracts 79 65586w (1973).
Chemical Abstracts 78 29620y (1973).

Primary Examiner—Paul F. Shaver
Attorney, Agent, or Firm—Gerald D. Sharkin; Richard E. Vila; Melvyn M. Kassenoff

[57] ABSTRACT

Complexes of the formula

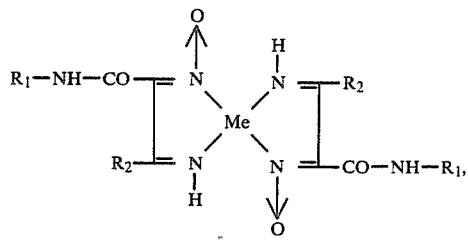

wherein
  each $R_1$ is independently a monocyclic or fused ring aromatic or heteroaromatic group free of water-solubilizing groups,
  each $R_2$ is independently is phenyl or methyl, and
  Me is Ni, Cu, Co or Zn, are useful as pigments for, for example, the mass pigmenting of synthetic plastics and resins, surface coatings and inks, pigment printing, textile coating and pigmenting paper in the mass.

18 Claims, No Drawings

1:2 METAL COMPLEXES OF 2-NITROSO-ACETOACETIC ACID AND BENZOYLACETIC ACID ARYLAMIDES

The invention relates to novel 1:2 metal complex compounds that are useful as pigments.

According to the invention, there is provided compounds of formula I

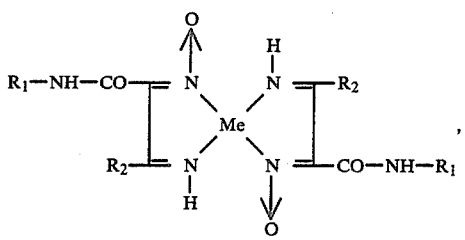

in which
  each $R_1$ independently is a single ring or fused ring aromatic or heteroaromatic group free of water-solubilising groups;
  each $R_2$ independently is phenyl or methyl; and
  Me is Ni, Cu, Co or Zn.

Preferably $R_1$ is $R_{1a}$ where $R_{1a}$ is phenyl, unsubstituted or substituted by 1 to 3 substituents selected from chloro, bromo, methyl, methoxy and ethoxy or benzoimidazolyl unsubstituted or monosubstituted by chloro, methyl or methoxy.

Preferably $R_2$ is methyl.
Preferably both groups R1 are the same.
Preferably both groups R2 are the same.
Preferably Me is Ni.

Further, according to the invention, there is provided a process for preparing a compound of formula I defined above comprising aminating and metalizing 2 moles of a compound of formula II

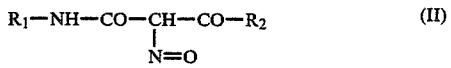

with 1 mole of a water-soluble Ni, Cu, Co or Zn salt in ammonia-alkaline medium. The amination is preferably effected at a temperature of 10° to 30° C. and is advantageously directly followed by the metalization at a temperature preferably from 20° to 100° C., more preferably 50° to 100° C., inclusive.

The compounds of formula II are known or can be prepared by known methods from known compounds.

Suitable water soluble salts include but are not limited to the halides, e.g. chlorides, acetates, nitrates, sulfates and formates of the aforementioned metals.

Amination and metalization of a compound of formula II is generally carried out in water but may also be carried out in water-soluble organic solvents such as lower alcohols, glycols and glycol ethers and in mixture of these solvents with water.

Preferably, the ammonia-alkaline medium contains ammonia in a concentration of about 5 to 25%, by weight.

The compounds of formula I can, according to known methods, be heat treated with high boiling point organic liquids, such as DMF (dimethylformamide), in which the compounds are not soluble in order to to purify the compounds so as to improve their pigment properties.

The compounds of formula I are suitable for the mass pigmenting of synthetic plastics and resins, free from or containing solvents, e.g. viscose, cellulose acetate, polyethylene, polystyrene, polyvinyl chloride and synthetic leathers and rubbers, of surface coatings, such as paints, whether oil or water based, lacquers and inks. They may also be used in pigment printing, textile coating and for pigmenting paper in the mass. They may be employed for such uses in conventional manner and in conventional amounts. They are particularly useful for the pigmentation of paints and lacquers.

The resulting dyeings incorporating compounds of formula I have good heat, light and weather fastness. They also have a good stability to chemicals and have good (low) migration properties e.g. resistance to surface blooming fastness and to solvents for migration when overcoatings are applied.

The compounds of formula I have a good dye strength and have good application properties such as good anti-flocculation and anti-crystalisation properties and good dispersibility.

The invention will now be illustrated by the following Examples in which all parts and percentages are by weight and all temperatures are in °C.

EXAMPLE 1

70.8 Parts of acetoacetanilide are added, with stirring, to a mixture of 300 parts of water and 60 parts of glacial acetic acid. The mixture is cooled to 5°, reacted with 28 parts of a 4N aqueous solution of sodium nitrite and stirred for 12 hours at 5° to 10°. The resulting nitroso compound (of formula II) is filtered off, washed with cold water, added to 200 parts of 25% ammonia solution and mixed with a solution of 51.2 parts of nickel acetate tetrahydrate in 300 parts of water. The mixture is heated from room temperature to 80° over a period of 30 minutes and then stirred at 80° for 12 hours and the resulting reaction product, which is the compound of formula Ia

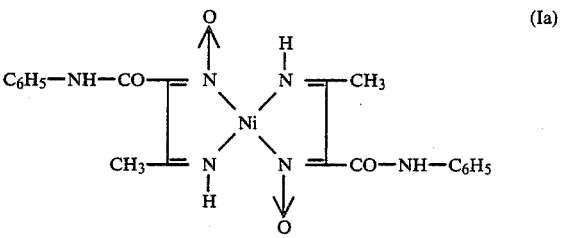

is hot filtered, washed with water and dried.

The resulting pigment is then refluxed for about 30 minutes in DMF (dimethylformamide) to purify the product and the product is then filtered, cold washed with methanol and dried. The product produces a yellow nuance in the substrate to be pigmented.

EXAMPLES 2 TO 12

Compounds of the formula

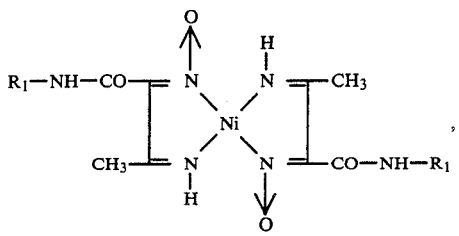

in which both $R_1$ groups are the same and are as defined in the Table below, can be prepared by a method analogous to that of Example 1 from appropriate reactants.

TABLE

| Ex. No. | $R_1$ | Colour of resulting pigmentation |
|---|---|---|
| 2 | 2,5-Dimethoxyphenyl | yellow |
| 3 | 2,4-Dimethoxyphenyl | orange |
| 4 | 2-Methoxyphenyl | yellow-orange |
| 5 | 2-Chlorophenyl | orange |
| 6 | 2-Methylphenyl | " |
| 7 | 4-Methylphenyl | " |
| 8 | 2,4-Dimethylphenyl | yellow-orange |
| 9 | 2,4-Dichlorophenyl | yellow |
| 10 | 4-Methoxyphenyl | orange |
| 11 | Benzoimidazolyl-5 | bordeaux-red |
| 12 | 4-chlorophenyl | orange |

EXAMPLES 13, 14 and 15

Example 12 is repeated using, instead of nickel acetate, an appropriate amount of copper acetate (Example 13), cobalt acetate (Example 14) or zinc chloride (Example 15). Pigmentations in coco-aldehyde-melamine resins made with the pigments of Examples 13 and 14 give a brown nuance and with that of Example 15 a light yellow nuance.

EXAMPLE 16

Example 1 is repeated using 109.2 parts of benzoylacetanilide instead of the 70 parts of acetoacetanilide. The resulting pigment colours cocoaldehydemelamine resin lacquers yellowish brown.

APPLICATION EXAMPLE A

4 Parts of the pigment of Example 1 are milled with 96 parts of a mixture of
50 parts of a 60% solution of coco-aldehyde-melamine resin (32% fat contant) in xylene;
30 parts of a 50% melamine resin solution in butanol;
10 parts of xylene and
10 parts of ethyleneglycol monoethylether in a ball mill for 24 hours.
The resulting dispersion is sprayed onto an aluminum piece, left to air dry for 30 minutes and then stoved for 30 minutes at 120°. A brilliant yellow film with good light and weather fastness properties results.

APPLICATION EXAMPLE B

A PVC sheet containing 0.1% pigment (average ratio coloured pigment to white pigment 1:5) can be prepared as follows:
16.5 parts of a softener mixture of equal parts dioctylphthalate and dibutylphthalate are mixed with 0.05 parts of a pigment of Example 1 and 0.25 parts of titanium dioxide. 33.5 Parts of polyvinylchloride are then added.

The mixture is mixed for 10 minutes between 2 rollers in a rolling machine, regularly cutting and rerolling the resulting sheet. One of the rollers is held at a temperature of 40° and the other at a temperature of 140°.

The mixture is then as a sheet and is pressed between two polished metal plates at 160° for 5 minutes.

A yellow PVC sheet having a high brilliance and very good migration good and light fastness results.

In application Examples A and B, an appropriate amount of any one of the pigments of Examples 2 to 16 may be used in place of the pigment of Example 1.

What is claimed is:

1. A complex of the formula

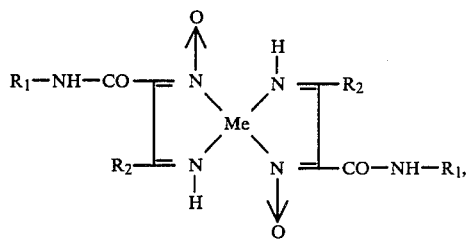

wherein
each $R_1$ is independently a single ring or fused ring carbocyclic aromatic group free of water-solubilizing groups or a benzoimidazolyl group free of water-solubilizing groups,
each $R_2$ is independently methyl or phenyl, and
Me is nickel, copper, cobalt or zinc.

2. A complex according to claim 1 wherein
each $R_1$ is independently phenyl; phenyl substituted by 1 to 3 substituents selected from chloro, bromo, methyl, methoxy and ethoxy; benzoimidazolyl or benzoimidazolyl monosubstituted by chloro, methyl or methoxy.

3. A complex according to claim 2 wherein both $R_2$'s are the same.

4. A complex according to claim 3 wherein each $R_2$ is methyl.

5. A complex according to claim 2 wherein Me is nickel.

6. A complex according to claim 2 wherein both $R_1$'s are the same.

7. A complex according to claim 6 wherein
each $R_1$ is phenyl or phenyl substituted by 1 to 3 substituents selected from chloro, bromo, methyl, methoxy and ethoxy.

8. A complex according to claim 6 wherein both $R_2$'s are the same.

9. A complex according to claim 8 wherein Me is nickel.

10. A complex according to claim 9 wherein each $R_2$ is methyl.

11. The complex according to claim 10 having the formula

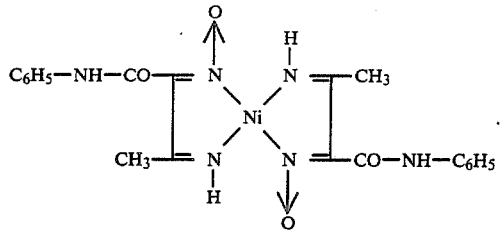

12. The complex according to claim 10 wherein each $R_1$ is 2,5-dimethoxyphenyl.
13. The complex according to claim 10 wherein each $R_1$ is 2,4-dimethoxyphenyl.
14. The complex according to claim 10 wherein each $R_1$ is 2-methoxyphenyl.
15. The complex according to claim 10 wherein each $R_1$ is 2-chlorophenyl.
16. The complex according to claim 10 wherein each $R_1$ is 2-methylphenyl.
17. The complex according to claim 10 wherein each $R_1$ is benzoimidazolyl-5.
18. A process for preparing a complex according to claim 1 comprising aminating and metallising 2 moles of a compound of the formula

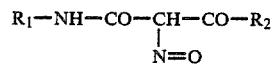

with 1 mole of a water-soluble Ni, Cu, Co or Zn salt in ammonia-alkaline medium at a temperature from 50° to 100° C., inclusive.

* * * * *